United States Patent [19]

Kuo

[11] 4,186,558
[45] Feb. 5, 1980

[54] THERMAL CONVERSION ENGINE

[76] Inventor: Sheafen F. Kuo, 40 Croft Pl., Staten Island, N.Y. 10314

[21] Appl. No.: 894,910

[22] Filed: Apr. 10, 1978

[51] Int. Cl.² ............................................. F03G 7/06
[52] U.S. Cl. ........................................ 60/527; 60/530
[58] Field of Search ......................... 60/527, 530, 531

[56] References Cited

U.S. PATENT DOCUMENTS

| 2,215,157 | 9/1940 | Platzner | 60/527 |
|---|---|---|---|
| 2,979,888 | 4/1961 | Moloney | 60/530 |
| 4,041,706 | 8/1977 | White | 60/527 |
| 4,075,845 | 2/1978 | Allen | 60/527 |

FOREIGN PATENT DOCUMENTS

| 671335 | 10/1963 | Canada | 60/527 |
|---|---|---|---|
| 360623 | 12/1905 | France | 60/527 |
| 8461 | of 1896 | United Kingdom | 60/527 |

Primary Examiner—Allen M. Ostrager
Attorney, Agent, or Firm—Richard L. Miller

[57] ABSTRACT

An engine which can convert thermal energy into mechanical energy by making use of the expansion in the volume of a liquid, such as water, when it freezes, and a corresponding decrease in the volume when the frozen material returns to its liquid state. A cylinder containing the liquid with a piston positioned above the liquid is placed in a large container through which a repetitive succession of cold fluids and hot fluids are passed. The cold fluid entering the container freezes the liquid in the cylinder. The volume of the liquid increases raising the piston. The cold fluid is then removed from the container and hot fluid applied to defrost the frozen material in the cylinder returning it to its liquid state. The volume then decreases causing a lowering of the piston. The reciprocating movement of the piston is applied to an output which can then be amplified to produce greater displacement.

1 Claim, 2 Drawing Figures

THERMAL CONVERSION ENGINE

BACKGROUND OF THE INVENTION

This invention relates to a thermal energy engine and more specifically, an engine which utilizes thermal energy to change the state of a liquid between a frozen and melted condition. One of the greatest problems of present times concerns the availability of energy sources and the production of mechanical motion from a suitable energy source. As the available amount of coal, oil and gas are continuously utilized, their cost is becoming prohibitive for continued economic use and alternate sources of energy are being sought. For example, the use of nuclear energy is being studied as well as the use of solar energy as a main source of power.

Numerous naturally occurring sources of energy are being tried to produce mechanical motion by means of a suitable engine. However, most of the engines, regardless of their energy source, produce a great amount of heat during the conversion process. The heat reduces efficiency since it is generally wasted and is a source of energy loss. Additionally, in many situations, the heat of the engine may be dangerous to the environment such as an ammunition plant, mine, fuel plant or the like. As a result, appropriate insulation and safety measures must be attended to, to prevent the heat from the engine to damage and harm the surrounding area. Additional problems with existing engines include their production of byproducts which tend to damage the environment. Most engines produce a great amount of pollution in the form smoke, heat, noise, and other items detremental to the environment. These not only reduce the efficiency but require additional systems to purify or compensate for the damage to the environment.

One source of energy which has hithertofore been given little consideration is the available thermal energy. There is generally a readily available supply of heated material and cooled material which could provide a temperature differential as a source of thermal energy. For example, there is naturally occurring cold fluids such as cold air, cold flowing water, as well as snow, ice, and other naturally occurring fluids which are readily available especially during a cold season and generate a cooling potential. Similarly, there is frequently available a natural heating potential from hot air, solar heat, hot water, or other natural available heated fluids.

In addition to the natural available cooling and heating resources, artificial heating and cooling fluids are also available and are generally discarded without finding any use. For example, the waste heat from a power plant or other industrial plant is generally discarded and unused. In addition to possibly contaminating the environment with pollution effects, it contains a loss of energy since the heat is not utilized for any purpose. In fact, often additional equipment such as a heat exchanger or cooling tower is used to dump the wasted heat from the power plant into the environment. This heated fluid provides a source of heating potential which can be utilized in conjunction with a cooled fluid.

The available cooling resources and heated resources provide a temperature differential which can be utilized as a source of thermal energy for operating an engine to convert the thermal energy into mechanical energy.

One problem, however, has been that heretofore little if any attention was given to recognize that there exists this source of thermal energy which can be utilized in a suitable engine. Furthermore, there was generally not recognized how to provide an engine for utilizing such thermal energy in the form of temperature differential, so that appropriate mechanical energy can be achieved.

SUMMARY OF THE INVENTION

Accordingly, it is an object of the present invention to provide an engine for converting thermal energy into mechanical energy.

A further object of the present invention is to provide an engine which utilizes the temperature difference between a cold fluid and a hot fluid in order to produce mechanical energy.

Still another object of the present invention is to provide an engine which is based upon the principal that when a liquid freezes it increases its volume; and contrary, when it defrosts it decreases in volume.

Still another object of the present invention is to provide an engine which can convert thermal energy to mechanical energy or electrical energy, by utilizing a temperature difference within a cycle under low temperature environment.

Yet a further object of the present invention is to provide an engine which is substantially pollution free, noise free, and high temperature hazard free.

A further object of the present invention is to provide an engine which can utilize the waste heat from a power plant or other industrial plant as energy resource.

Still another object of the present invention is to provide an engine which can utilize climatic changes which in turn produce temperature changes in naturally occurring fluids, the temperature change being utilized as an energy resource to produce mechanical energy.

Yet a further object of the present invention is to provide an engine which converts thermal energy into mechanical energy and operates in a substantially cold environment.

A further object of the present invention is to provide a cold engine which can operate alone or with a conventional hot engine to achieve high efficiency.

Still a further object of the present invention is to provide an engine for converting thermal energy into mechanical energy which utilizes a motion amplifier to increase the displaced motion.

A further object of the present invention is to provide a motion amplifier which can increase the displacement distance of a given motion.

Briefly, the present invention provides for an engine which can convert thermal energy into mechanical energy. The engine includes an outer container which has a hot fluid input port, a cold fluid input port, and at least one output port. Positioned in the container is at least one cylinder which contains a liquid. A piston is located on the surface of the liquid with a piston rod extending therefrom. An output device is coupled to the piston rod. The liquid in the cylinder is periodically frozen and melted by a repetitive succession of the hot and cold fluids entering into the container. This causes the piston rod to reciprocate the output device as the volume of the liquid changes between its frozen and melted states.

In an embodiment of the invention, there is provided a plurality of the cylinders, all acting in parallel to drive a common output device. The output device is in turn coupled to a motion amplifier which can amplify the piston rod displacement.

The aforementioned objects, features and advantages of the invention will, in part, be pointed out with particularity and will, in part, become obvious from the following more detailed description of the invention, taken in conjunction with the accompanying drawings which forms an integral part thereof.

BRIEF DESCRIPTION OF THE DRAWINGS

In the drawing.

In the various figures of the drawing, like reference characters designate like parts.

DESCRIPTION OF THE PREFERRED EMBODIMENTS

Figure 2:
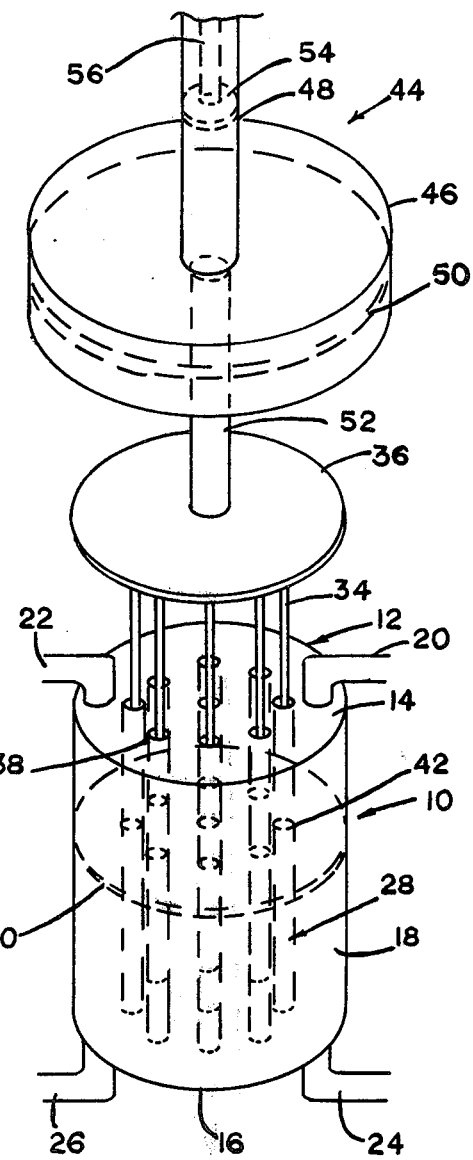
FIG. 2 is a schematic drawing of the entire engine of the present invention utilizing a plurality of individual cylinders as shown in FIG. 1.

Referring now to FIG. 2 the engine of the present invention is shown generally at 10 and includes an outer cylindrical container 12 having an upper end wall 14 and a bottom wall 16 with a perimetric side wall 18. Coupled to the container are four ports. Two ports are connected through the top wall 14 and designated as ports 20 and 22. Two additional ports are connected adjacent to the bottom wall 16 and are designated as ports 24, 26.

Figure 1:
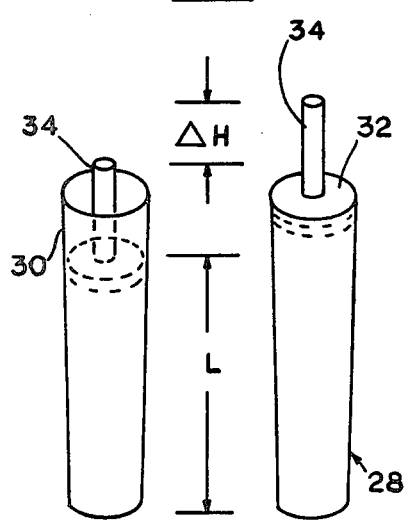
FIG. 1 shows an individual piston-cylinder arrangement containing a liquid.

Located within the container 12 are a plurality of cylinders shown generally at 28. Referring now to FIG. 1, it will be noted that the cylinders are formed of elongated tubes 30 in which is placed a liquid. A piston head 32 sits on top of the liquid with a piston rod 34 extending from the piston 32 and upward from the cylinder 30.

The height of the liquid is initially shown by the letter L. As is known, with many liquids as they freeze their volume increases. For example, when water freezes, it increases its volume by approximately 10%. This means that when 10 cubic centimeters of water freezes, approximately 11 cubic centimeters of ice will form. Therefore, when the liquid in the cylinder is in its fluid state, the piston will be at its lower position immediately above the column of liquid L. However, when the liquid is frozen and turns to its frozen state, such as ice, the liquid will expand. Since the walls of the cylinder are rigid, it will force the piston 32 upward so that the displacement of the piston will be $\Delta H$. The amount of displacement $\Delta H$ can be calculated from the following formula:

$$\Delta H = L \times E\%$$

wherein E represents the percent increase in volume from the liquid to the frozen state.

Referring back to FIG. 2, it will be noted that a plurality of the cylinders 28 are positioned in parallel within the container 12. A number of openings 38 are provided in the upper wall 14 of the container to permit passage therethrough of the piston rods 34.

The upper ends of all of the piston rods are in turn coupled to a disc 36 which serves as the output device.

Operation of the engine will now be explained. Initially each of the cylinders are filled with water and their pistons placed above the water. A substantially identical amount of water will be placed in all of the cylinders so that the plate 36 will lie in a horizontal plane. A cold fluid, such as cold brine at approximately minus 20 degrees F. flow in through the port 24 into the container 12. Any previous fluid, such as hot water, which might have been in the container is forced out through the port 26. The cold fluid flowing into the container will serve to freeze the water in the cylinders causing the volume to increase as it turns to ice. As a result, the pistons will move upwardly causing the output plate 36 to correspondingly be displaced in an upward direction.

In the next phase of operation, the cold fluid in the container is forced out of the container through the port 22. The temperature of the cold fluid leaving the container will be higher than entering fluid temperature, say minus 10 degrees F. The increase in temperature results from the latent heat released from the frozen water in the cylinder. A hot fluid such as hot water 120 degrees F. then flows in through the port 20 into the container. The hot fluid will then defrost the ice in the cylinders causing the volume of the material in the cylinders to decrease thereby causing the output plate 36 to move downward. When the icing operation is to begin again, the hot fluid is first sent out of the container through the port 22. This hot fluid leaves at say, approximately 100 degrees F. with the decrease in temperature being utilized to provide the latent heat necessary to change the ice back to its liquid state.

The sequence of bringing in cold fluid followed by hot fluid continues whereby the pistons will reciprocate within the cylinders as the liquid freezes and then returns back to its liquid condition. As a result, the plate 36 will continuously provide vertical movement reciprocally.

It will be noted that utilizing the engine as described, the hot fluid enters at the upper port 20 and leaves through the diagonally opposite port 26. The cold fluid enters through the bottom at the port 24 and leaves from the diagonally opposed port 22 adjacent the top.

An alternate method of operating the engine would be to include a thermal separator plate 40 internal of the container and transverse thereacross. The thermal separator includes openings 42 to accommodate passage therethrough of the cylinders whereby the thermal separator is free to move vertically within the container.

In operating the engine including the thermal separator, the cold fluid would be sent into the container through both the ports 24 and 26 in the bottom wall 16 of the container. Any hot fluid which might be in the container would leave through the top two ports 20 and 22. As the cold fluid enters, it pushes the thermal separator up and permits filling of the entire container with the cold fluid. The water in the cylinders would then freeze and turn into ice. The output plate 36 would then move upward since the ice occupies more volume than the liquid.

In the next stage of operation, the hot fluid flows into the container through the upper ports 20 and 22. The cold fluid will then leave through the lower ports 24 and 26. The thermal separator then moves downward as the hot fluid fills the container. The water in the cylinders will return to its liquid condition and the output plate 36 will descend.

It will be noticed that all water in a cylinder will not be frozen at once. If water is frozen at top first, the cylinder wall may be broken later. The ice stuck in the upper wall of cylinder will prevent any further volume expansion of the water yet to be frozen. Hence the cold fluid must enter into the container from lower ports.

In order to increase the displacement produced by the engine, a motion amplifier 44 can be connected to the output plate 36. The motion amplifier includes a double cylinder arrangement having a first cylinder 46 with a large diameter forming a rather thin and wide shaped cylinder. A second cylinder 48 is provided which has a smaller diameter forming a narrow elongated type of cylinder. The two cylinders 46, 48 are in fluid flow communication so that a single common fluid can flow from the large cylinders 46 to the small cylinder 48.

A first piston 50 is placed in the large cylinder 46. A piston rod 52 interconnects the large piston 50 with the output plate 36. A second, smaller piston 54 is placed in the smaller cylinder 48 with a piston rod 56 extending therefrom. The fluid in the motion amplifier 44 is contained between the two cylinders 50 and 54.

It will be appreciated, that because of the relative sizes of the cylinders, as the piston 50 moves a small distance within its large cylinders 46, the piston 54 will be forced to move a substantially greater distance within its cylinder 48. As a result, a motion amplifier is provided so that a small displacement can be converted into a substantially larger displacement.

Typically the fluid contained within the motion amplifier 44 is a high viscosity oil which provides sufficient force to drive the pistons. The combination of the engine 10 and the motion amplifier 44 provides a prime mover of substantially great force and rather large displacement which can be utilized as a source of mechanical energy.

In operating the total system, the cold fluid can be provided from various natural or artificial sources. For example, natural cooling resources can be collected and utilized during the cold season. Also, the cold resource or by products from industries, such as cooling potential of liquified natural gas can be used to generate the cooling fluid for the thermal conversion engine. This cooled fluid can be temporarily stored prior to its entry into the engine.

Similarly, the hot fluids can be provided either naturally or artificially. For example, the hot air or solar heat readily available, especially during warm weather can be collected and stored. Additionally, wasted heat from industrial plants which are usually not used can also be collected and stored.

The stored cold and heated fluids can then alternately be sent into the engine to provide the various changes needed to drive an output device. The mechanical power produced from the engine can then be sent to a mechanical power buffer. In fact, a series of such engine can be utilized together to provide additional mechanical power to the buffer. A buffer which can be utilized is, by way of example, a rotating wheel. When the speed of the wheel exceeds a prefixed amount, a transfer mechanism will transfer the kinetic energy from the buffer to a kinetic energy capacitor. This can store the kinetic energy for subsequent use as either mechanical or electrical energy.

It will therefore be appreciated, that with the engine heretofore described, there is utilized thermal energy for conversion into mechanical energy. Furthermore, the engine provided is a cold engine without producing a great amount of wasted heat. Also, to a great extent natural resources can be utilized to provide the hot and cold fluids needed.

There has been disclosed heretofore the best embodiments of the invention presently contemplated. However, it is to be understood that various changes and modifications may be made thereto without departing from the spirit of the invention.

I claim:

1. An engine for converting thermal energy into mechanical energy, comprising:

an outer container having a system of ports for providing a hot fluid input port, cold fluid input port, and output ports for the hot and the cold fluid;

at least one cylinder positioned in said container, a liquid in said cylinder, a piston on the surface of said liquid and a piston rod extending from said piston; and an output means coupled to said piston rod, whereby the liquid in said cylinder is periodically frozen and melted by a repetitive succession of cold fluid and hot fluid in said container, thereby causing said piston rod to reciprocate said output means as the volume of liquid changes between its frozen and melted states, wherein said system of ports comprises four separate ports, two of which accommodate cold fluid input and output, and two of which accommodate hot fluid input and output, and wherein said container is hollow and is of elongated shape, and comprises a top and bottom cover at respective opposite ends of said container, said top cover having openings therein through which extend said piston rod, and wherein said hot fluid input and output ports are located adjacent to one end of said container, said cold fluid input and output ports are located adjacent to the other end of said container, and further comprising a thermal separator transversely positioned within said container and freely movable in a longitudinal direction.

* * * * *